US010907951B2

(12) United States Patent
Avci (10) Patent No.: US 10,907,951 B2
(45) Date of Patent: Feb. 2, 2021

(54) SINGLE-CHIP OPTICAL COHERENCE TOMOGRAPHY DEVICE

(71) Applicant: IXA AMC Office / Academic Medical Center, Amsterdam (NL)

(72) Inventor: Bakiye Imran Avci, Amsterdam (NL)

(73) Assignee: Academisch Medisch Centrum, Amsterdam (NL)

(*) Notice: Subject to any disclaimer, the term of this patent is extended or adjusted under 35 U.S.C. 154(b) by 21 days.

(21) Appl. No.: 16/336,067

(22) PCT Filed: Sep. 26, 2017

(86) PCT No.: PCT/IB2017/055876
§ 371 (c)(1),
(2) Date: Mar. 22, 2019

(87) PCT Pub. No.: WO2018/055606
PCT Pub. Date: Mar. 29, 2018

(65) Prior Publication Data
US 2019/0257640 A1    Aug. 22, 2019

Related U.S. Application Data

(60) Provisional application No. 62/399,771, filed on Sep. 26, 2016.

(51) Int. Cl.
*G01B 9/02*    (2006.01)
(52) U.S. Cl.
CPC ..... *G01B 9/02028* (2013.01); *G01B 9/02027* (2013.01); *G01B 9/02051* (2013.01);
(Continued)

(58) Field of Classification Search
CPC ............ G01B 9/02027; G01B 9/02028; G01B 9/02051; G01B 9/02091; G01B 2290/40; G01B 2290/55; G01B 2290/45
See application file for complete search history.

(56) References Cited

U.S. PATENT DOCUMENTS 6,175,671 B1    1/2001  Roberts
10,006,809 B2   6/2018  Hu et al.
(Continued)

OTHER PUBLICATIONS

Yuqing Jiao et al., "InAs/InP(100) quantum dot waveguide photodetectors for swept-source optical coherence tomography around 1.7 µm", "Optics Express", Jan 31, 2012, Publisher: Optical Society of America, pp. 3675-3692, vol. 20, No. 4.
(Continued)

*Primary Examiner* — Michael A Lyons
(74) *Attorney, Agent, or Firm* — Kaplan Breyer Schwarz, LLP (57) ABSTRACT

A high-performance single-chip, integrated-optics-based OCT system is disclosed, where the length of the reference arm is digitally variable. The reference arm includes a plurality of switch stages comprising a 2×2 tunable wavelength-independent waveguide switch that can direct an input light signal onto either of two different-length output waveguides. In some embodiments, the directional couplers are thermo-optic based. Some embodiments include a solid-state scanning system for scanning a sample signal along a line of object points on the sample under test.

20 Claims, 8 Drawing Sheets

(52) U.S. Cl.
CPC ...... *G01B 9/02091* (2013.01); *G01B 2290/40* (2013.01); *G01B 2290/55* (2013.01)

(56) References Cited

U.S. PATENT DOCUMENTS

| | | | |
|---|---|---|---|
| 2006/0034569 | A1 | 2/2006 | Shih |
| 2010/0245831 | A1 | 9/2010 | Okamoto |
| 2011/0170161 | A1 | 7/2011 | Gill et al. |
| 2011/0255054 | A1* | 10/2011 | Hacker ................ G01B 9/0203 351/211 |
| 2012/0050744 | A1 | 3/2012 | Takada et al. |
| 2014/0078510 | A1 | 3/2014 | Rubio Guivernau et al. |
| 2014/0118748 | A1* | 5/2014 | Rubio Guivernau ......... G01B 9/02058 356/479 |
| 2014/0125983 | A1* | 5/2014 | Nitkowski ............ G01J 3/0218 356/450 |
| 2014/0375999 | A1 | 12/2014 | Okamoto |
| 2014/0376000 | A1* | 12/2014 | Swanson ............ G01B 9/02091 356/479 |
| 2015/0092195 | A1* | 4/2015 | Blatter ................ A61B 5/6821 356/479 |
| 2017/0052016 | A1* | 2/2017 | Sancho Dur ....... G01B 9/02091 |
| 2019/0003820 | A1* | 1/2019 | van Leeuwen .... G01B 9/02058 |

OTHER PUBLICATIONS

Okamoto, Katsunari, "Multimode Interference (MMI) Device", "Fundamentals of Optical Waveguides", dated 2005, Publisher: Elsevier Science, pp. 46-55, http://ebookcentral.proquest.com/lib/epo-ebooks/detail.action?docID+269548.

Milos Nedeljkovic et al., "Mid-Infrared Silicon-on-Insulator Fourier-Transform Spectrometer Chip", "IEEE Photonics Technology Letters", Feb. 15, 2016, DOI: 10.1109/LPT.2015.2496729, pp. 528-531, vol. 28, No. 4.

K. Takiguchi et al., "Integrated-optic variable delay line and its application to a low-coherence reflectometer", "Optics Letters", Oct. 15, 2005, Publisher: Optical Society of America, pp. 2739-2741, vol. 30, No. 20.

Gunay Yurtsever et al., "Photonic integrated Mach-Zehnder interferometer with an on-chip reference arm for optical coherence tomography", "Biomedical Optics Express", DOI: 10.1364/BOE.5.001050, Mar. 3, 2014, Publisher: Optical Society of America, pp. 1050-1061, vol. 5, No. 4.

Duc Nguyen V et al: "Integrated-optics-based swept-source optical coherence tomography", Optics Letters, Optical Society of Amer ica, US, vol. 37, No. 23, Dec. 1, 2012 (Dec. 1, 2012), pp. 4820-4822.

Bauke W. Tilma et al., "Integrated Tunable Quantum-Dot Laser for Optical Coherence Tomography in the 1.7 μm. Wavelength Region", "IEEE Journal of Quantum Electronics", Feb. 1, 2012, DOI: 10.1109/JQE.2011.2165317, pp. 87-98, vol. 48, No. 2.

B. Imran Akca, "Design of a compact and ultrahigh-resolution Fourier-transform spectrometer", "Optics Express", Jan. 23, 2017, Publisher Optical Society of America, vol. 25, No. 2, http://dx.doi.org/10.1364/OE.25.001487.

B. Imran Akca et al., "Toward Spectral-Domain Optical Coherence Tomography on a Chip", "IEEE Journal of Selected Topics in Quantum Electronics", May 1, 2012, pp. 1223-1233, vol. 18, No. 3.

Authorized Officer: Schmidt, Charlotte, International Search report and Written Opinion issued in PCT application No. PCT/IB2017/055873, dated Jan. 16, 2018, 11 pages.

Authorized Officer: Braun, P, International Search Report and Written Opinion issued in PCT application No. PCT/IB2017/055876, dated Jan. 24, 2018, 12 pages.

Non-Final Rejection dated Jul. 6, 2020 for U.S. Appl. No. 16/335,587.

* cited by examiner

SINGLE-CHIP OPTICAL COHERENCE TOMOGRAPHY DEVICE

CROSS REFERENCE TO RELATED APPLICATIONS

This case claims priority of U.S. Provisional Patent Application Serial Nos. 62/399,729, filed Sep. 26, 2016 and 62/399,771, filed Sep. 26, 2016, each of which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to medical imaging systems in general, and, more particularly, to optical coherence tomography.

BACKGROUND OF THE INVENTION

Optical coherence tomography (OCT) has become an increasingly popular diagnostic tool in areas such as the biological, biomedical, medical screening, and vision-care. It utilizes low-coherence optical interferometry to enable non-invasive imaging of micron-scale microstructure inside biological tissue. In recent years, OCT has rapidly become competitive with radiography, ultrasound and magnetic resonance imaging in the biological and biomedical imaging communities due, in part, to its relatively low cost and high-resolution, in-vivo capabilities, as well as its lack of ionizing radiation. In the vision-care arena, for example, OCT is used to non-invasively image the human eye fundus, thereby facilitating diagnosis of retinal pathologies, such as macular degeneration, glaucoma, retinitis, pigmentosa, and the like.

Early OCT systems were typically time-domain systems based on a relatively simple implementation of the classic Michelson interferometer. In such an interferometer, an input light signal is split into a reference arm and a sample arm. In the reference arm, light is directed toward a movable reference mirror, which continuously reflects light back toward the detector. The length of the reference arm depends on the position of this mirror. In the sample arm, light is directed at an object point of a sample under test and only light reflected by sub-surface features in the sample is returned toward the detector. The length of the sample arm, therefore, is based on the positions of features within the sample tissue. A beam combiner combines the two reflected light signals to form an interferometric signal that generates an interference pattern at a detector. Light that travels the same length in each of the reference arm and sample arm constructively recombines to form high-intensity signals at the detector.

A one-dimensional scan of the surface and sub-surface features of the object point is developed by scanning the reference mirror at a constant speed to change the length of the reference arm. This encodes the depths of the surface and sub-surface features in time based on the position of the reference mirror, as represented in the interference pattern that is subsequently sampled by the detector.

Unfortunately, while early time-domain OCT techniques were promising, their complexity and time-intensive nature served to limit their widespread adoption. As a result, Fourier-domain OCT (FD-OCT) was developed, which offers significant improvements over time-domain OCT.

FD-OCT is a method in which the interferometric signal is sampled by a detector as a function of wavelength rather than mirror position. FD-OCT systems are capable of faster imaging with improved sensitivity. In FD-OCT, typically, an object point in a sample is interrogated with a light source that sweeps through a range of optical frequencies (i.e., a swept source). As a result, the object point is illuminated with a monochromatic beam whose optical frequency is a function of time. This results in an interferometric signal of intensity versus wavenumber, k (k is proportional to the inverse of wavelength). A mathematical algorithm, referred to as a Fourier transform, is then used to convert the interferometric signal to a plot of intensity versus depth.

SD-OCT interrogates an object point with broad-spectrum light. Light reflected from the object point is dispersed by wavelength along a row of detectors, which simultaneously provide a different output signal for each of a plurality of wavelength components. As a result, information is collected from many depths within the object point at the same time, and a Fourier transform operation can be used to convert this information into a plot of intensity versus depth.

Unfortunately, current state-of-the-art OCT systems are rather bulky, complex, and sensitive to alignment issues, since they contain a multitude of fiber and free-space optical components. As a result, there has been a push toward miniaturized OCT systems based on integrated-optics, which have the potential for mitigating or overcoming many of these issues.

An integrated-optics system includes one or more optical waveguides formed on the surface of a substrate. The optical waveguides can be combined in myriad arrangements, typically referred to as planar-lightwave circuits (PLCs), which can provide complex optical functionality. Each "surface waveguide" (sometimes referred to herein as simply "waveguides") includes a light-guiding core surrounded by cladding material that substantially confines a light signal conveyed by the surface waveguide to the core material.

Several integrated-optics-based "micro-spectrometers" have been developed based upon different configurations. For example, Yurtsever, et al., disclosed an FD-OCT system based on a swept source and an on-chip Michelson interferometer in "Integrated photonic circuit in silicon on insulator for Fourier domain optical coherence tomography," in Proc. *SPIE*, Vol. 7554, pp. 1-5 (2010). This system achieved 40-µm axial resolution and 25-dB sensitivity. In addition, a partially integrated SD-OCT system that included an arrayed waveguide grating (AWG) spectrometer was disclosed by Akca and Nguyen, et al., in "Toward spectral-domain optical coherence tomography on a chip," *IEEE J. Sel. Top. Quantum Electron*, Vol. 18, pp. 1223-1233 (2012) and "Spectral domain optical coherence tomography imaging with an integrated optics spectrometer," *Opt. Lett.*, Vol. 36, pp. 1293-1295 (2011). Jiao and Tilma, et al., disclosed SS-OCT systems based on InAs/InP quantum-dot-based waveguide photodetectors and a tunable laser source in "InAs/InP(100) quantum dot waveguide photodetectors for swept-source optical coherence tomography around 1.7 µm," *Opt. Express*, Vol. 13, pp. 3675-3692 (2012) and "Integrated tunable quantum-dot laser for optical coherence tomography in the 1.7 µm wavelength region," *IEEE J. Quantum Electron*, Vol. 48, pp. 87-98 (2012). It was shown that such systems could perform cross-sectional imaging with an in-depth detection range that approached the level of existing bulk optical systems.

More recently, an SS-OCT system comprising a combination of Michelson interferometer, reference arm, and directional coupler for balanced detection was disclosed by Nguyen, et al., "Integrated-optics-based swept-source optical coherence tomography," *Opt. Lett.*, Vol. 137, pp. 4820-2822 (2012). This system was used to demonstrate that a phantom could be imaged with 80-dB sensitivity and a 5-mm depth range in air. Unfortunately, due to the relatively short length of the reference arm of the system, scanning of the sample was required to obtain cross-sectional images.

The need for sample scanning could be overcome by employing a long on-chip reference arm, as disclosed by Yurtsever, et al., in "Photonic integrated Mach-Zehnder interferometer with an on-chip reference arm for optical coherence tomography," *Biomed. Opt. Express*, Vol. 5, pp. 1050 (2014) and "Ultra-compact silicon photonic integrated interferometer for swept-source optical coherence tomography," *Opt. Lett.*, Vol. 39, pp. 5228-5231 (2014). Unfortunately, due to the fixed-nature of the layout of the integrated-optics components, these systems required extremely complicated dispersion compensation and relatively poor signal-to-noise ratio (SNR) as compared to fiber-based system.

Despite the advances of integrated-optics technology, and the rich palette of optical effects available for exploitation, the need for a practical, high-performance integrated-optics-based OCT system remains, as yet, unmet in the prior art.

SUMMARY OF THE INVENTION

The present invention enables a high-resolution integrated-optics-based optical coherence tomography (OCT) system that overcomes some of the costs and disadvantages of the prior art. OCT systems in accordance with the present invention include a reference arm whose total length can be digitally varied. In addition, the optical power of the reference signal carried in the reference arm can be controlled. As a result, the present invention enables OCT systems whose dispersion compensation is less complex than the prior art, as well as OCT system having improved signal-to-noise-ratio performance. Embodiments of the present invention are particularly well suited for use in optical coherence tomography systems and the like.

An illustrative embodiment includes a source, a pair of photodetectors, a processor, and a planar-lightwave circuit (PLC) that is formed on a single substrate, which collectively define an OCT system. The PLC comprises a 3-dB coupler, a plurality of surface waveguides that includes a reference waveguide, an interrogation waveguide, and a return waveguide, a beam combiner, and a delay controller. An input light signal from the source is distributed into a sample signal and a reference signal, which propagate through a sample arm and reference arm, respectively.

The sample arm includes an interrogation waveguide and a return waveguide, where the interrogation waveguide provides the sample signal to a sample under test and the return waveguide couples sample-signal light reflected by the sample based on its surface and sub-surface structure. The return waveguide conveys the reflected signal to a beam combiner.

The reference arm comprises two reference waveguide portions that are optically coupled with the delay controller, which is located between them. The delay controller has a length that can be digitally controlled by the processor to effect a desired total length of the reference arm and, therefore, a desired delay for the reference signal. The length of the delay controller is based on a plurality of switch stages, each of which can be configured to have one of two different lengths. Furthermore, the delay controller includes waveguide switch at its output, which can direct the reference signal to the beam combiner and/or controller photodetector for providing a dispersion signal to the processor. In addition, the delay controller can control the amount of optical power in the reference signal as it is received at the beam combiner.

The beam combiner combines the reference signal and the reflected signal to generate an interference signal whose intensity is based on the structure of the sample. The interference signal is detected at the photodetector which provides an output signal to the processor. The processor processes the output signal to develop an estimate of the structure of the sample.

In some embodiments, the interrogation waveguide includes a scanning system at its output facet, which enables the sample signal to be scanned along a row of object points on the sample to generate a "B-scan" of the sample.

An embodiment of the present invention is an integrated-optics-based optical coherence tomography (OCT) system having a sample arm and a reference arm, the OCT system comprising a photonic lightwave circuit (PLC) that is monolithically integrated on a substrate, wherein the PLC includes: (i) a coupler for distributing the input light signal into a sample signal on the sample arm and a reference signal on the reference arm; (ii) a beam combiner for combining the reference signal and a reflected signal from a sample to generate an interference signal, the reflected signal being based on the sample signal and the sample; and (iii) a reference arm for conveying the reference signal from the coupler to the beam combiner, wherein the reference arm includes a delay controller that is operative for digitally controlling the length of the reference arm within a range from a minimum length to a maximum length.

Another embodiment of the present invention is a method for performing optical coherence tomography (OCT), the method comprising: providing a planar-lightwave circuit (PLC) that includes a coupler, a reference waveguide, a delay controller, and a beam combiner, wherein the PLC is monolithically integrated on a substrate; distributing an input light signal received at the coupler into a sample signal on a sample arm and a reference signal on a reference arm, wherein the reference arm includes the reference waveguide and the delay controller; providing the sample signal to a sample; receiving a reflected signal at a beam combiner, wherein the reflected signal is based on the sample signal and the sample; conveying the reference signal from the coupler to the beam combiner via the reference waveguide and the delay controller; combining the reference signal and the reflected signal at the beam combiner to generate an interference signal; and digitally controlling a length of the reference arm within a range from an initial length to a maximum length.

DETAILED DESCRIPTION

Figure 1:
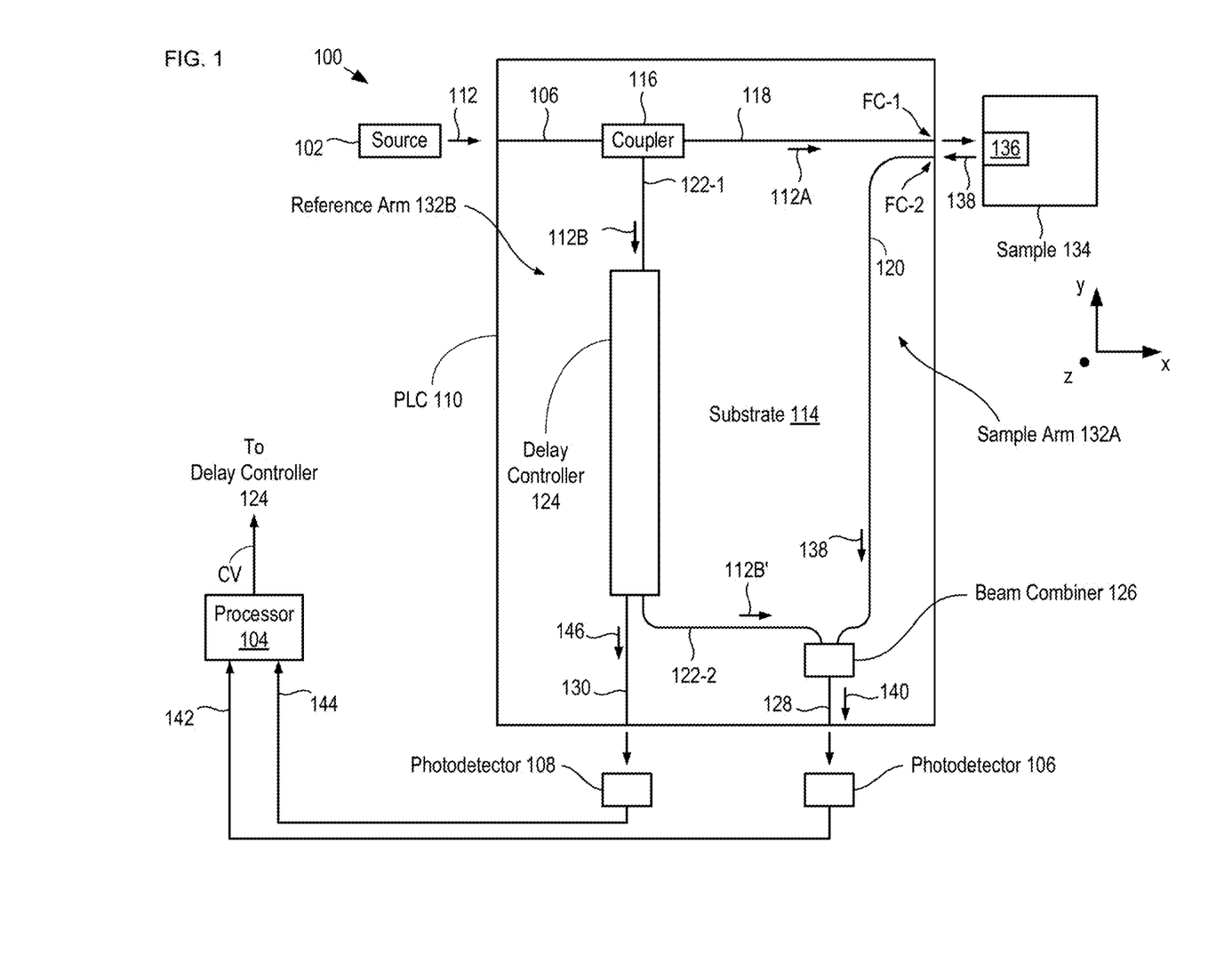
FIG. 1 depicts a schematic diagram of an optical coherence tomography system in accordance with an illustrative embodiment of the present invention.

FIG. 1 depicts a schematic diagram of an optical coherence tomography system in accordance with an illustrative embodiment of the present invention. System 100 includes source 102, processor 104, photodetectors 106 and 108, and PLC 110.

Source 102 is a conventional coherent-light source that is operative for providing light signal 112 to PLC 110. In the depicted example, source 102 is an edge-emitting laser that emits light signal 112 such that it has a center wavelength of approximately 1300 nm. In some embodiments, source 102 comprises a different coherent-light source and/or emits light at centered at a different wavelength.

Processor 104 is a conventional instrument controller and processing system operative for providing control signal CV to PLC 110 based on output signal 142 and dispersion signal 144 received from photodetector 106 and photodetector 108, respectively. Typically, processor 104 is also operative for processing the output signal received from PLC 110 to develop an estimate of the structure at object point 136 of sample 134.

Photodetector 106 is a conventional photodetector that is operative for providing an electrical output signal (i.e., output signal 142) based on the intensity of interference signal 140 received from beam combiner 126, as discussed below.

Photodetector 108 is a conventional photodetector that is operative for providing dispersion signal 144 to processor 104, where the dispersion signal is based on optical signal 146, which includes at least a portion of the reference signal as it leaves delay controller 124. This enables any dispersion mismatch between the two arms of the OCT system to be compensated by processor 104, as discussed below.

PLC 110 is an arrangement of surface waveguides monolithically integrated on substrate 114. PLC 110 includes coupler 116, interrogation waveguide 118, return waveguide 120, reference waveguide 122, delay controller 124, beam combiner 126, output waveguide 128 and dispersion control waveguide 130. In some embodiments, at least one of source 102, photodetectors 106 and 108 is integrated with PLC 110 either by forming it on substrate 114 in monolithically integrated fashion or bonding it with the substrate using hybrid integration techniques.

Figure 2:
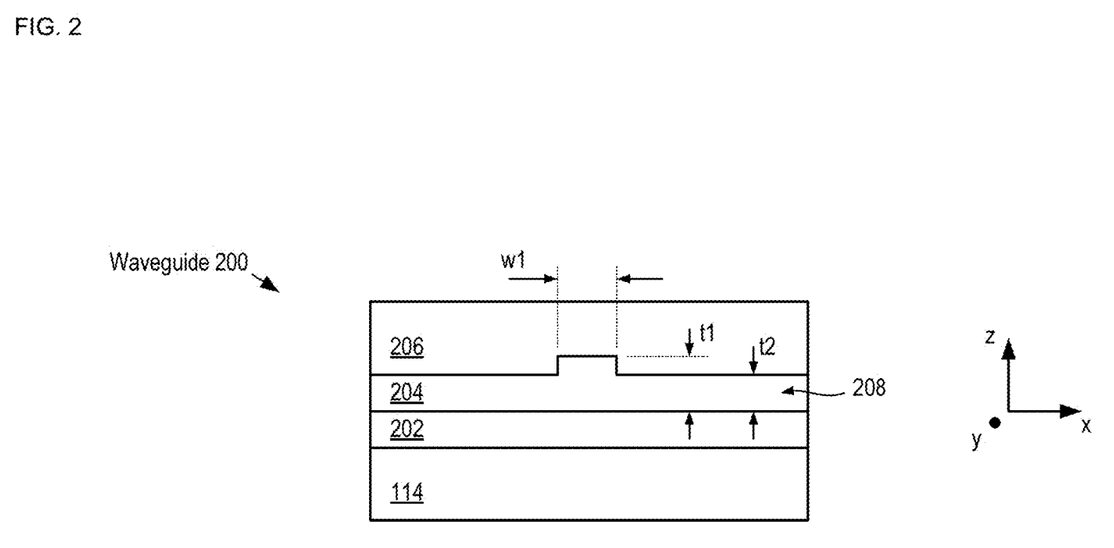
FIG. 2 depicts a schematic drawing of a cross-sectional view of a surface waveguide structure that is representative of each of the surface waveguides of PLC 110.

FIG. 2 depicts a schematic drawing of a cross-sectional view of a surface waveguide structure that is representative of each of the surface waveguides of PLC 110. Waveguide 200 includes lower cladding 202, core 204, and upper cladding 206, all of which are disposed on substrate 114.

Substrate 114 is a conventional silicon substrate. In some embodiments, substrate 114 comprises a suitable material other than silicon, such as a different semiconductor, glass, lithium niobate, a silicon compound (e.g., silicon germanium, silicon carbide, etc.), and the like.

Lower cladding 202 is a layer of silicon dioxide having a thickness of approximately 8 microns, which is formed on substrate 114 via thermal oxidation or another appropriate method.

Core 204 is a layer of light-guiding material 208, which has been sculpted to define a single-mode channel-waveguide structure having width, w1, of approximately 2.2 microns and a height, h1, of approximately 1 micron.

In the depicted example, material 208 is silicon oxynitride (SiON) that is characterized by a refractive index of approximately 1.535 at a wavelength of 1300 nm and a thermo-optic coefficient of approximately 2.35 $K^{-1}$. In the depicted example, material 208 is deposited on lower cladding 202 using plasma-enhanced chemical-vapor deposition (PECVD); however, any suitable deposition process can be used to form core 204.

Upper cladding 206 is a layer of silicon dioxide having a thickness of approximately 500 nm.

The material in each of lower cladding 202 and upper cladding 206 is characterized by a refractive index of approximately 1.4485. The effective refractive index of entire material stack of waveguide 200, therefore, is approximately 1.472 (for TE polarized light).

In the depicted example, core 204 comprises silicon oxynitride (SiON) and each of lower cladding 202 and upper cladding 206 comprises silicon dioxide; however, one skilled in the art will recognize, after reading this Specification, that myriad materials (e.g., silicon nitride, silicon, lithium niobate, compound semiconductors, glasses, silicon oxides, etc.) can be used in the core and cladding layers of waveguide 200 without departing from the scope of the present invention. It should be noted that, as discussed below, the illustrative embodiment includes a delay controller that employs waveguide switches that operate based on the thermo-optic effect and, as a result, it is preferable that this embodiment employs surface waveguides that are characterized by a relatively high thermo-optic coefficient. Some embodiments of the present invention, however, employ waveguide switches based on a different switching principle, such as the electro-optic effect, induced stress, etc. In such embodiments, it is preferable that their included waveguides are designed to facilitate the use of the respective switching principle employed.

It should be noted that, although the illustrative embodiment comprises surface waveguides that are single-mode channel waveguides, surface waveguides having different propagation characteristics, geometries, structures, and/or materials can be used in embodiments of the present invention without departing from the scope of the present invention.

Returning now to FIG. 1, coupler 116 is a conventional, adiabatic 3-dB directional coupler that evenly distributes light signal 112 into sample signal 112A and reference signal 112B and provides them to sample arm 132A and reference arm 132B, respectively. In some embodiments, the split ratio of coupler 116 is other than 50:50. In some embodiments, coupler 116 is a different optical-power-splitting element, such as a y-coupler, etc. In some embodiments, coupler 116 includes an element, such as a spotsize converter, lens, etc., at its input port to mitigate coupling loss. In some embodiments, coupler 116 receives input signal 112 via an edge coupler, a vertical-grating coupler, and the like. In some embodiments, coupler 116 receives input signal 112 from an external element, such as an optical fiber, a bulk lens, a lensed optical fiber, a high-numerical-aperture fiber, the output port of a photonic-integrated circuit (PIC) or PLC, etc.

Sample arm 132A includes interrogation waveguide 118, return waveguide 120, and the portion of sample 134 that is interrogated by sample signal 112A (i.e., object point 136). Interrogation waveguide 118 conveys sample signal 112A from coupler 116 to sample 134. Return waveguide 120 receives light of sample signal 112A reflected by the sample and conveys the reflected light to beam combiner 126. It should be noted that the sample arm also includes the round-trip free-space path between PLC 110 and sample 134; however, since the travel distance in free-space is typically very short, its contribution to sample arm 132A is considered insignificant to the operation of system 100 and is excluded from the consideration of sample arm 132A, including in the appended claims.

As discussed above, prior-art OCT systems include reference arms that are of fixed length. Unfortunately, due to the static nature of such reference arms, as well as the fact that the light in the reference arm is normally inaccessible, dispersion compensation becomes challenging in these systems. In addition, a static reference arm precludes adjustment of the optical power of the reference signal to improve signal-to-noise ratio (SNR). Embodiments of the present invention, however, include a reference arm that comprises a delay controller that enables control over both the length of the reference arm and the optical power of the reference signal that propagates through it. In addition, the delay controller is dimensioned and arranged to optically couple the reference signal in the reference arm to photodetector 108, which provides processor a direct indication of the dispersion in the system. As a result, embodiments of the present invention are afforded significant advantages over prior-art OCT systems, such as higher SNR and dispersion compensation that is more easily achieved.

Reference arm 132B includes reference waveguide portions 122-1 and 122-2 and delay controller 124.

Each of reference waveguide portions 122-1 and 122-2 is a fixed-length waveguide for conveying reference signal 112B. Waveguide portion 122-1 optically couples coupler 116 and delay controller 124, while waveguide portion 122-2 optically couples delay controller 124 and beam combiner 126.

Delay controller 124 is a network of waveguide switches and waveguide portions that enables the length of reference arm 132B to be digitally varied between its initial length and a maximum length that is based on the number of switch stages included in the delay controller, as discussed below. Delay controller 124 is operative for receiving reference signal 112B from coupler 116 and providing reference signal 112B' (where reference signal 112B' is the potentially delayed version of reference signal 112B) and light signal 146 based on the configuration of the plurality of waveguide switches it contains.

Figure 3:
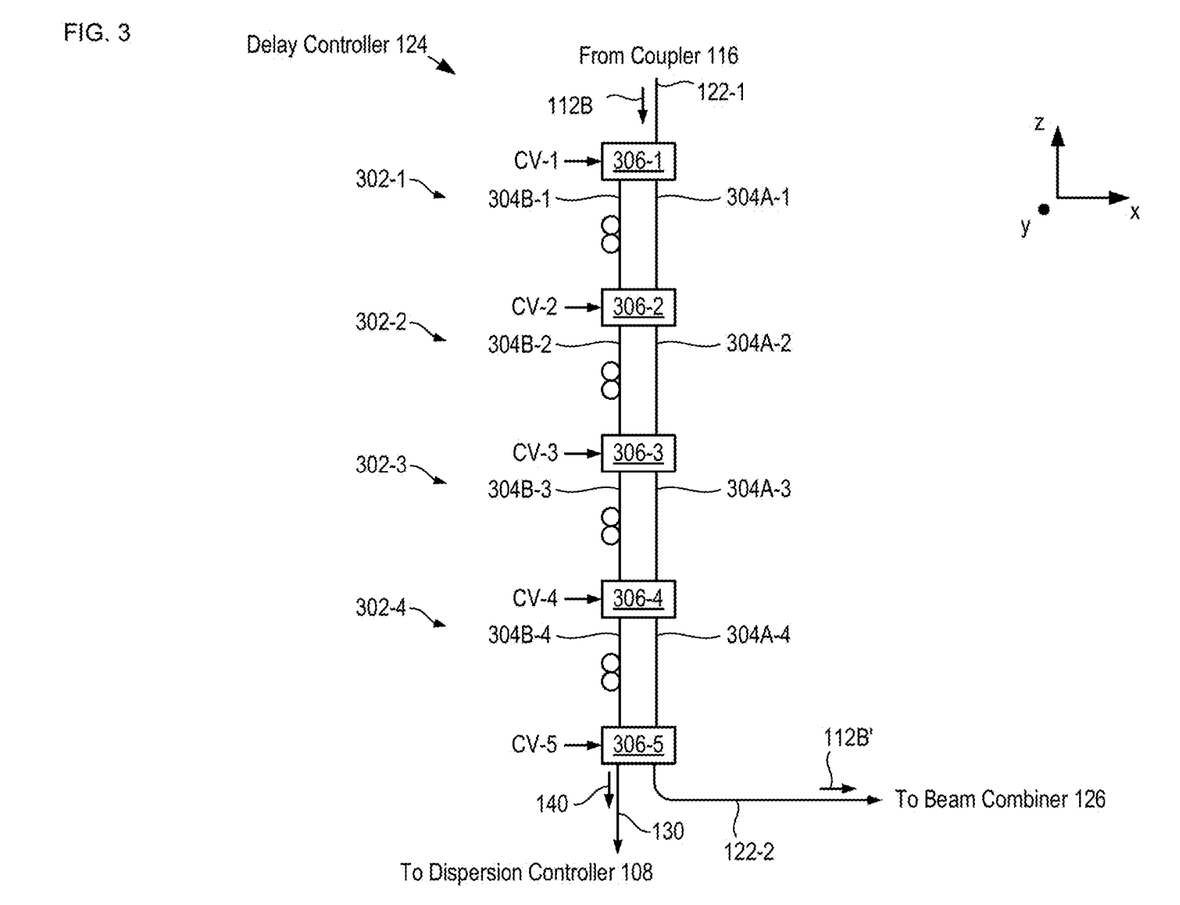
FIG. 3 depicts a schematic drawing of a delay controller in accordance with the illustrative embodiment.

FIG. 3 depicts a schematic drawing of a delay controller in accordance with the illustrative embodiment. Delay controller 124 includes switch stages 302-1 through 302-4 and waveguide switch 306-5. Although the illustrative embodiment comprises a delay controller having four switch stages, delay controllers in accordance with the present invention can include any practical number of switch stages without departing from the scope of the present invention.

Each of switch stages 302-$i$, where i=1 through 4, includes waveguide portions 304A-$i$ and 304B-$i$, which are optically coupled with waveguide switch 306-$i$. Each waveguide switch 306-$i$ controls the path of light signal 112B through its respective waveguide portions 304A-$i$ and 304B-$i$ based on the magnitude of control voltage CV-$i$ provided by processor 104.

Figure 4A:
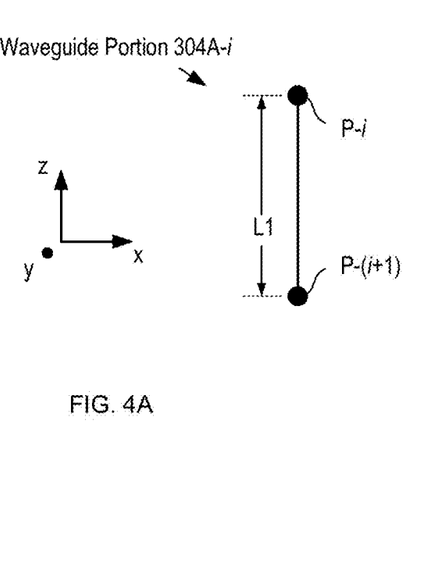
FIG. 4A depicts a schematic drawing of waveguide portion 304A-i in accordance with the illustrative embodiment.

FIG. 4A depicts a schematic drawing of waveguide portion 304A-$i$ in accordance with the illustrative embodiment. Waveguide portion 304A-$i$ is a substantially straight waveguide section having length L1. In the depicted example, waveguide portions 304A-1 through 304A-4 (referred to, collectively, as waveguide portions 304A) are substantially identical and L1 is equal to 1 cm; however, in some embodiments, at least one of waveguide portions 304A has a different shape and/or length.

Figure 4B:
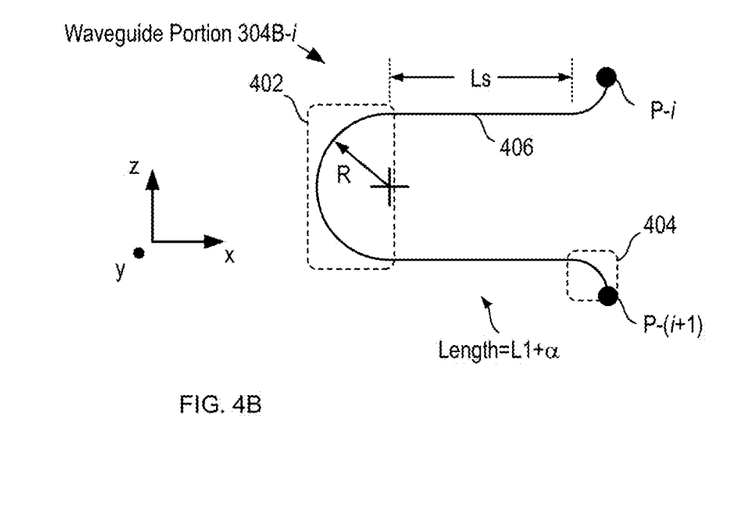
FIG. 4B depicts a schematic drawing of waveguide portion 304B-i in accordance with the illustrative embodiment.

FIG. 4B depicts a schematic drawing of waveguide portion 304B-$i$ in accordance with the illustrative embodiment. Waveguide portion 304B-$i$ is a curved waveguide that includes waveguide sections 402, waveguide sections 404, and waveguide sections 406.

Waveguide section 402 is a half-circle-shaped waveguide having radius R.

Each of waveguide sections 404 is a quarter-circle-shaped waveguide having radius R.

Each of waveguide sections 406 is a straight waveguide having length Ls.

In the depicted example, the magnitude of R is selected such that waveguide sections 402 and 404 have a combined length that equals the length of waveguide portion 304A-$i$ (i.e., L1). The overall length of waveguide portion 304B-$i$, therefore, is equal to 2Ls+L1. In the depicted example, waveguide portions 304B-1 through 304B-4 (referred to, collectively, as waveguide portions 304B) are substantially identical and Ls is 1 cm; however, in some embodiments, at least one of waveguide portions 304B has a different shape and/or length. One skilled in the art will recognize, after reading this Specification, that the length of Ls determines the resolution with which the length of reference arm 132B can be tuned.

In the illustrative embodiment, the initial length of reference arm 132B is approximately 20 cm. Since delay controller 124 includes four switch stages, each enabling an additional 2 cm to be added, the maximum length of the reference arm is 28 cm. The length of the reference arm, therefore, can be digitally controlled within the range of approximately 20 cm to approximately 28 cm, in increments of 2 cm, by providing each of waveguide switches 306-$i$ with the appropriate control voltage CV-$i$. It should be noted that these values are merely exemplary, and any practical lengths can be used for any dimension of system 100, including the initial length of reference arm 132B, as well as the length of any of waveguide portions 304A and 304B.

The inclusion of straight waveguide sections 406 in waveguide portions 304B affords design flexibility by adding optical length while curved waveguide sections 402 and 404 help keep the total chip footprint required for each waveguide portion 304B reasonably small enabling a compact design for system 100.

Using the exemplary dimensions provided above, the entirety of PLC 110 can be contained within a 2 cm×2 cm region, which is readily formed on a single chip. It should be noted, however, that by using a high-index-contrast waveguide material system for waveguide 200 (e.g. based on a core of silicon or silicon nitride, etc.), the chip area required for PLC 110 can be reduced significantly.

Figure 5A:
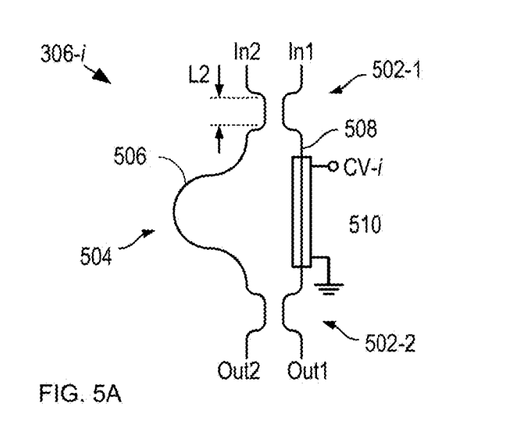
FIG. 5A depicts a schematic drawing of a waveguide switch in accordance with the illustrative embodiment.

FIG. 5A depicts a schematic drawing of a waveguide switch in accordance with the illustrative embodiment. Waveguide switch 306-*i* is a 2×2 cross-bar switch that controls the optical coupling between input ports In1 and In2 and output ports Out1 and Out2 based on the magnitude of the control voltage CV-i. Waveguide switch 306-*i* is a Mach-Zehnder-type interferometric coupler that includes a pair of directional couplers 502-1 and 502-2, which reside on either side of delay section 504. Waveguide switch 306-*i* is representative of each of waveguide switches 306-1 through 306-5 (referred to, collectively, as switches 306).

Each of directional couplers 502-1 and 502-2 (referred to, collectively, as couplers 502) is a conventional directional coupler having length L2. Directional couplers 502-1 and 502-2 are "complimentary directional couplers." For the purposes of this Specification, including the appended claims, the term "complimentary directional couplers" is defined as directional couplers that operate in concert such that any deviations introduced in one directional coupler are substantially compensated for in the other directional coupler. In some embodiments, directional couplers 502-1 and 502-2 are not complimentary directional couplers.

Delay section 504 includes delay waveguide 506, trunk waveguide 508, and heater 510, which is disposed on trunk waveguide 508 and electrically connected to control signal CV-i.

Waveguide switch 306-*i* is a thermo-optic waveguide switch; therefore, as light propagates through one of delay waveguide 506 and trunk waveguide 508, the coupling between them is controlled by the temperature of heater 510. In some embodiments, delay controller 124 includes waveguide switches based on other effects such as electro-optic, piezoelectric, stress, liquid-crystal-based, and the like.

Waveguide switch 306-*i* has a cross-coupling ratio that can be tuned anywhere within the range from 0% (no cross-coupling) to 100% (full cross-coupling). The coupling ratio of the waveguide switch is given by:

$$S = \cos^2(\theta)\sin^2(\varphi_1+\varphi_2) + \sin^2(\theta)\sin^2(\varphi_1-\varphi_2)$$

where $\varphi_1$ and $\varphi_2$ are the half-phase differences between the fundamental and first-order system modes existing in the parallel-waveguide coupler sections of each of couplers 502-1 and 502-2, and $2\theta=\beta(\lambda)\Delta L$ is the relative phase delay introduced in the delay section by the path-length difference, $\Delta L$, between delay waveguide 506 and trunk waveguide 508 and the propagation constant of the waveguide mode $\beta(\lambda)$.

To provide waveguide switch 306-*i* (i.e., the full coupler) with a maximally flat wavelength response, the parameters can be chosen as $\varphi_1=\pi/2$ (full coupler), $\varphi_2=\pi/2$ (full coupler), and $2\theta=2\pi/3$ for ease of design and fabrication. Based on these design parameters, in the depicted example, the length, L2, of each of directional couplers 502-1 and 502-2 is 155 microns, and the path-length difference, $\Delta L$, is 0.29 microns. The total length of the waveguide switch 306-*i* is 1.6 mm.

Figure 5B:
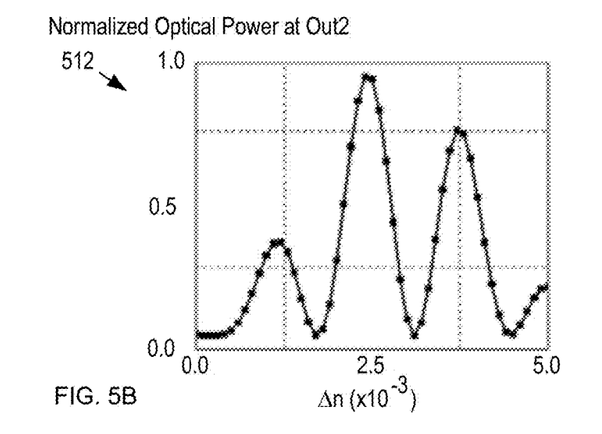
FIG. 5B depicts simulation results of cross-coupled optical power and relative refractive index between delay waveguide 506 and trunk waveguide 508 for a waveguide switch 306-i.

FIG. 5B depicts simulation results of cross-coupled optical power and relative refractive index between delay waveguide 506 and trunk waveguide 508 for a waveguide switch 306-*i*. Plot 512 shows the optical power at output port Out2 for a light signal injected into input port In1 as a function of the refractive index difference between delay waveguide 506 and trunk waveguide 508. As seen in plot 512, for $\Delta n=2.4 \times 10^{-3}$, 96% of the light signal injected into trunk waveguide 508 will cross-couple to the delay waveguide 506, which occurs at a heater temperature of approximately 102 K.

Figure 5C:
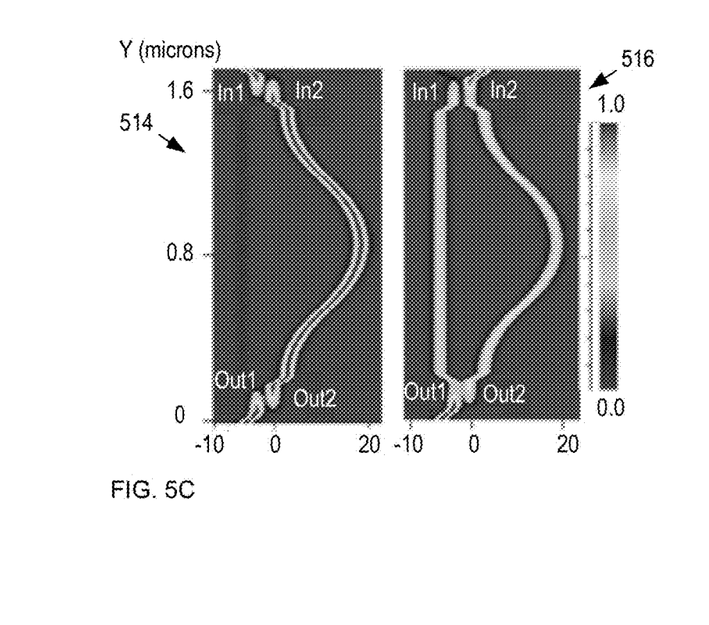
FIG. 5C depicts simulation results for the splitting ratio of waveguide switch 306-i.

FIG. 5C depicts simulation results for the splitting ratio of waveguide switch 306-*i*. Plot 514 shows that cross-coupling is substantially non-existent in the switch when 0 voltage is applied to heater 510 and the switch is at room temperature. Plot 516 shows that full cross-coupling existents in the switch when sufficient voltage is applied to heater 510 and the switch is at an elevated temperature.

Figure 5D:
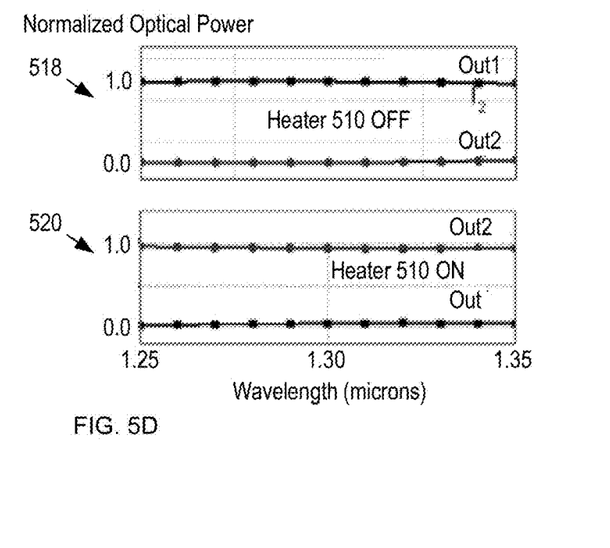
FIG. 5D depicts simulation results for the splitting ratio of waveguide switch 306-i.

FIG. 5D depicts simulation results for the splitting ratio of waveguide switch 306-*i*. Plots 518 and 520 demonstrate that the splitting ratio between delay waveguide 506 and trunk waveguide 508 is substantially wavelength independent over a 100-nm wide bandwidth in both the cross and bar states of the switch.

After reference signal 1128 passes through switch stages 302-1 through 302-4, it propagates through switch 306-5 which directs some or all of the optical power of reference signal 1128 to either photodetector 108 as light signal 146 or to beam combiner 126 as reference signal 1128'. Waveguide switch 306-5 is substantially identical to each of waveguide switches 306-1 through 306-4.

Beam combiner 126 is a surface-waveguide element operative for recombining sample signal 112A and reflected signal 138 to generate interference signal 140 and provide it to photodetector 106.

Figure 6:
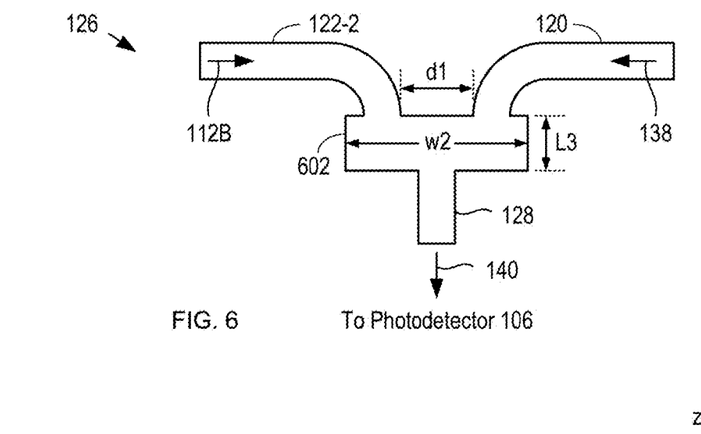
FIG. 6 depicts a schematic drawing of a beam coupler in accordance with the illustrative embodiment.

FIG. 6 depicts a schematic drawing of a beam coupler in accordance with the illustrative embodiment. Beam combiner 126 comprises slab 602 and output waveguide 128, each of which is analogous to waveguide 200 described above and with respect to FIG. 2.

Slab 602 is a region of a waveguide structure analogous to that of waveguide 200, but which is dimensioned and arranged to recombine the light signals conveyed by reference waveguide 122-2 and return waveguide 120 and provide the recombined light signal to output waveguide 128 as interference signal 140. Slab 602 has width, w2, and length, L3, which are selected to enable two-mode interference (TMI) within the slab region. The structure of beam combiner 126 is preferred over a more-conventional Y-junction because it is more fabrication tolerant and, therefore, its performance is more reproducible. In the depicted example, w2 is 6 microns, L3 is 33 microns, and reference waveguide 122-2 and return waveguide 120 are separated by separation distance, d1, which is 1.4 microns.

Figure 7A:
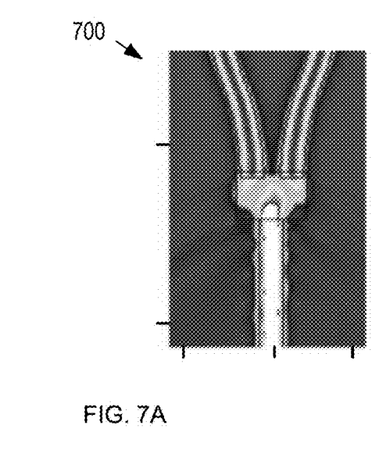
FIGS. 7A-C show BPM simulation results for beam combiner 126 under different input conditions.
Figure 7B:
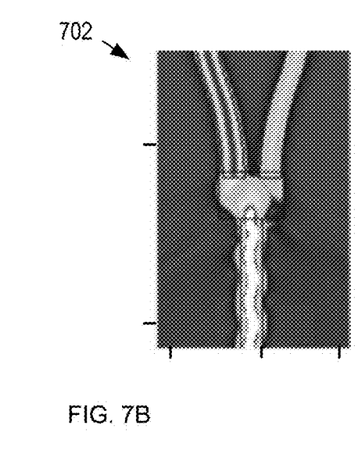
Figure 7C:
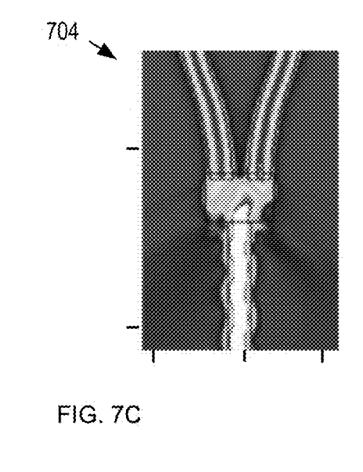

FIGS. 7A-C show BPM simulation results for beam combiner 126 under different input conditions. The radiation loss of the beam combiner is dependent on the phase difference between reference signal 112B' and reflected signal 138, as received at slab 602, as well as their relative power.

Plot 700 shows the coupling of the light signals when reference signal 112B' and reflected signal 138 are in phase and have equal power. As seen in the plot, all input power is coupled into the first-order even mode and, therefore, transmitted through slab region 602 into output waveguide 128. It is estimated that, in this case, beam combiner 126 will provide interference signal 140 having approximately 96% of the optical power received from reference waveguide 122-2 and return waveguide 120. In other words, the minimum optical loss through the beam combiner is approximately 4%.

Plot 702 shows the coupling of the light signals when reference signal 112B' and reflected signal 138 are in phase and have a power ratio of 0.5. This power disparity gives rise to a power reduction of only 4%, relative to the equal power case depicted in plot 700 (i.e., interference signal 140 has approximately 92% of the optical power received from reference waveguide 122-2 and return waveguide 120).

Plot 704 shows the coupling of the light signals when light signals 112B' and 138 have a phase difference of π/6. In this case, the output power of interference signal 140 is reduced to approximately 89% of the combined input power of reference signal 112B' and reflected signal 138 (i.e., a reduction of 7% from the in-phase, equal power case depicted in plot 700).

In the depicted example, beam combiner 126 is based on two-mode interference (TMI); however, other beam combiners can be used in PLC 110 without departing from the scope of the present invention.

Figure 8:
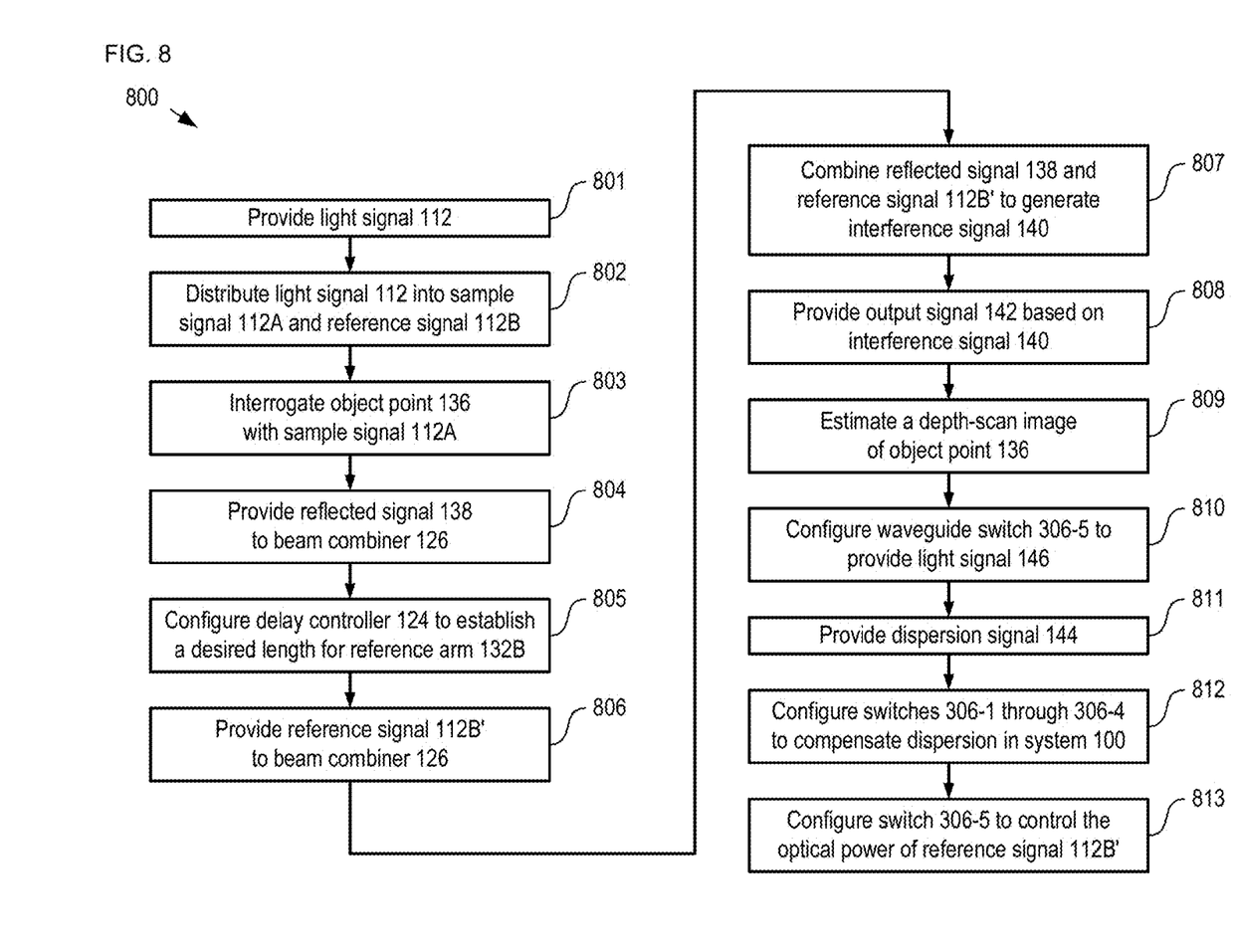
FIG. 8 depicts operations of a method suitable for performing optical coherence tomography in accordance with the illustrative embodiment.

FIG. 8 depicts operations of a method suitable for performing optical coherence tomography in accordance with the illustrative embodiment. Method 800 begins with operation 801, wherein source 102 provides light signal 112.

At operation 802, light signal 112 is distributed into sample signal 112A and reference signal 112B at coupler 116.

At operation 803, object point 136 of sample 134 is interrogated with sample signal 112A. Sample 134 receives sample signal 112A from output facet FC-1 of interrogation waveguide 118 as a free-space light signal. Typically, a lens or other bulk-optics system is used to capture the free-space light emanating from interrogation waveguide 118 and focus it to a spot on sample 134 (not shown in FIG. 1).

When interrogated with sample signal 112A, object point 136 reflects reflected signal 138, which is optically coupled into input facet FC-2 of return waveguide 120. The spectral content of reflected signal 138 is based on the set of wavelength components in the sample signal and the surface and sub-surface features at object point 136. Preferably, FC-1 and FC-2 are closely spaced to mitigate optical loss between PLC 110 and sample 134.

At operation 804, return waveguide 120 provides reflected signal 138 to beam combiner 126.

At operation 805, processor 104 configures delay controller 124 to establish the desired length of reference arm 132B.

At operation 806, reference waveguide 122-2 provides reference signal 1126' to beam combiner 126.

At operation 807, light signals 138 and 112B' are combined at beam combiner 126 to generate interference signal 140.

At operation 808, photodetector 106 provides output signal 142 based on the intensity of interference signal 140.

At operation 809, processor 104 estimates a depth-scan image of the structure at object point 136 based on output signal 142.

At operation 810, processor 104 configures waveguide switch 306-5 to provide at least a portion of reference signal 112B' to photodetector 108 as light signal 146.

At operation 811, photodetector 108 provides dispersion signal 144 based on light signal 146 and provides it to processor 104.

At operation 812, processor 104 determines the dispersion in system 100 (typically via a third-order polynomial approach) and provides dispersion compensation for system 100 by controlling the coupling ratios of waveguide switches 306-1 through 306-4 based on dispersion signal 144.

At operation 813, processor 104 controls the optical power of reference signal 112B' by controlling the coupling ratio of waveguide switch 306-5 based on output signal 142. By controlling the power of reference signal 112B', system 100 enables output signal 142 to have improved SNR.

System 100, as described above, is operative for generating an axial-depth scan at a single object point on sample 134 (typically referred to as an "A-scan"). It is often desirable, however, to scan a row of object points to generate a cross-sectional image of a linear region of a sample (a "B-scan") or, in some cases, to scan a two-dimensional array of object points (a "C-scan"). To enable B-scans and/or C-scans, at least one of system 100 and sample 136 can be located on a scanning stage that is capable of one- or two-dimensional scanning. Unfortunately, changing the physical arrangement between an OCT system and a sample can lead to positional inaccuracy and noise in the output signal from which the imaging is constructed.

In some embodiments of the present invention, a solid-state scanning system is incorporated into sample arm 132A to eliminate the need to physically scan system 100 or sample 134 to generate a B-scan.

Figure 9:
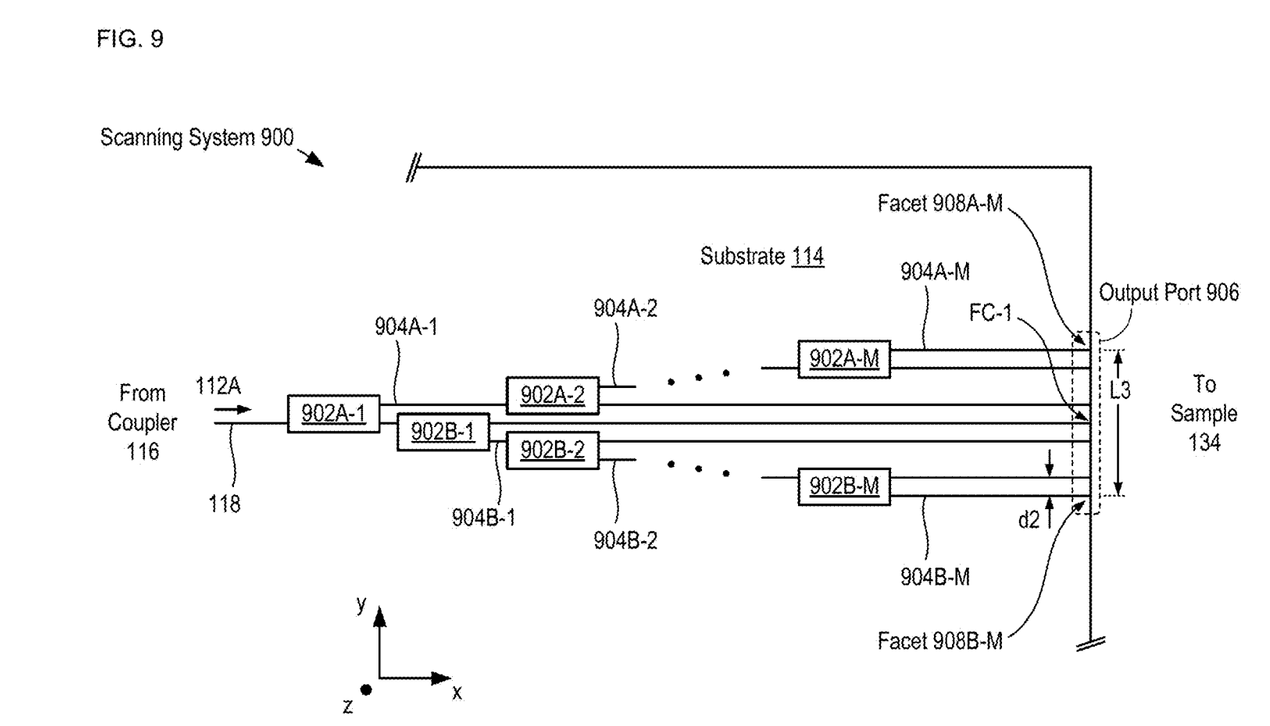
FIG. 9 depicts a schematic drawing of a solid-state beam-scanner in accordance with an alternative embodiment of the present invention.

FIG. 9 depicts a schematic drawing of a solid-state beam scanner in accordance with an alternative embodiment of the present invention. Scanner 900 includes interrogation waveguide 118, scanner waveguides 904A-1 through 904A-M and 904B-1 through 904B-M, waveguide switches 902A-1 through 902A-M and 902B-1 though 902B-M, and output port 906.

Each of waveguide switches 902A-1 through 902A-M and 902B-1 though 902B-M is analogous to waveguide switch 306-*i* described above.

Each of scanner waveguides 904A-1 through 904A-M and 904B-1 through 904B-M (referred to, collectively, as scanner waveguides 904) is analogous to waveguide 200 described above. Scanner waveguides 904A-1 through 904A-M and 904B-1 through 904B-M include facets 908A-1 through 908A-M and 908B-1 through 908B-M, respectively.

Output port 906 includes output facet FC-1 of interrogation waveguide 118, as well as facets 908A-1 through 908A-M and 908B-1 through 908B-M. The output facets included in output port 906 are preferably separated by uniform spacing d2. In the depicted example, M is equal to 100 and d2 is equal to 10 microns; therefore, the 101 output facets of output port enable light signal 112A to be scanned over a total scan length, L3, of 1 mm. It should be noted that any of M, d2, and L3 can have any practical value without departing from the scope of the present invention.

To scan sample signal 112A along output port 906, the appropriate set of waveguide switches 902 are actuated such that they enable full cross-coupling. For example, to emit the sample signal from the output facet of scanning waveguide 904A-M, all of waveguide switches 902A-1 through 902A-M are actuated. To move the sample signal to the output facet of scanning waveguide 904A-(M-1), all of waveguide switches 902A-1 through 902A-M-1 are actuated but 902A-M is not.

Since actuation of each waveguide switch can occur in microseconds, scanning sample signal 112A over the total scan length, L3, of output port 906 can be done in a significantly shorter time than for mechanical scanners, such as galvanometer scanners, etc.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An integrated-optics-based optical coherence tomography (OCT) system having a sample arm and a reference arm, the OCT system comprising a photonic lightwave circuit (PLC) that is monolithically integrated on a substrate, wherein the PLC includes:

(i) a coupler for distributing an input light signal into a sample signal on the sample arm and a reference signal on the reference arm;
(ii) a beam combiner for combining the reference signal and a reflected signal from a sample to generate an interference signal, the reflected signal being based on the sample signal and the sample; and
(iii) the reference arm, wherein the reference arm is operative for conveying the reference signal from the coupler to the beam combiner, and wherein the reference arm includes a delay controller that is operative for digitally controlling the length of the reference arm within a range from a minimum length to a maximum length;
a first photodetector configured to provide an output signal based on the interference signal;
a second photodetector configured to provide a dispersion signal that is based on a first signal received from the delay controller, wherein the first signal includes at least a portion of the reference signal; and
a processor that is operative for compensating a dispersion mismatch between the reference arm and sample arm based on the dispersion signal.

2. The system of claim 1 wherein the delay controller is also operative for controlling the optical power of the reference signal received at the beam combiner.

3. The system of claim 1 wherein the OCT system further includes:
(iv) a first waveguide for conveying the sample signal from the coupler to the sample; and
(v) a second waveguide for receiving a reflected signal from the sample and conveying the reflected signal to the beam combiner, the reflected signal being based on the sample signal and the sample.

4. The system of claim 1 wherein the delay controller comprises a plurality of switch stages, each switch stage including:
a first waveguide portion having a first length;
a second waveguide portion having a second length that is different than the first length; and
a waveguide switch that is operative for optically coupling a light signal received at a first input port to either of the first waveguide portion and the second waveguide portion.

5. The system of claim 4 wherein each waveguide switch includes:
a delay section that includes a trunk waveguide and a delay waveguide, wherein the delay section is operative for controlling cross-coupling between the trunk waveguide and the delay waveguide based on a control signal;
wherein the trunk waveguide is optically coupled with one of the first waveguide portion and the second waveguide portion; and
wherein the delay waveguide is optically coupled with the other one of the first waveguide portion and the second waveguide portion.

6. The system of claim 5 wherein each waveguide switch further includes:
a first directional coupler; and
a second directional coupler;
wherein the delay section is between the first and second directional couplers; and
wherein the first and second directional couplers are complimentary directional couplers.

7. The system of claim 4 wherein at least one waveguide switch of the plurality thereof is operative for controlling the portion of its respective light signal that is optically coupled into each of the first waveguide portion and the second waveguide portion based on a thermo-optic effect.

8. The system of claim 1 wherein the beam combiner is operative for combining the reference signal and the reflected signal based on two-mode interference.

9. The system of claim 1 wherein the PLC further includes a beam scanner that is operative for providing the sample signal to a plurality of object points on the sample, wherein the beam scanner comprises:
a plurality of waveguides, each waveguide including a facet, wherein the plurality of facets collectively defines an output port; and
a plurality of waveguide switches, wherein each waveguide switch of the plurality thereof is operative for switching light between a different pair of waveguides of the plurality thereof;
wherein a first waveguide of the plurality of waveguides is dimensioned and arranged to receive the sample signal from the coupler.

10. The system of claim 9 wherein the facets of the plurality thereof are uniformly spaced.

11. A method for performing optical coherence tomography (OCT), the method comprising:
providing a planar-lightwave circuit (PLC) that includes a coupler, a reference waveguide, a delay controller, and a beam combiner, wherein the PLC is monolithically integrated on a substrate;
distributing an input light signal received at the coupler into a sample signal on a sample arm and a reference signal on a reference arm, wherein the reference arm includes the reference waveguide and the delay controller;
providing the sample signal to a sample;
receiving a reflected signal at the beam combiner, wherein the reflected signal is based on the sample signal and the sample;
conveying the reference signal from the coupler to the beam combiner via the reference waveguide and the delay controller;
combining the reference signal and the reflected signal at the beam combiner to generate an interference signal;
providing an output signal from a first photodetector, wherein the output signal is based on the interference signal;
controlling the delay controller to digitally control a length of the reference arm within a range from an initial length to a maximum length;
directing a dispersion signal to a second photodetector, wherein the dispersion signal includes at least a portion of the reference signal; and
compensating a dispersion mismatch between the reference arm and sample arm based on the dispersion signal.

12. The method of claim 11 further comprising controlling the optical power of the reference signal received at the beam combiner.

13. The method of claim 11 further comprising providing the beam combiner such that it is operative for combining the reference signal and the reflected signal based on two-mode interference.

14. The method of claim 11 wherein the length of the reference arm is controlled by controlling the length of the delay controller.

15. The method of claim 14 further comprising:
providing the delay controller such that it includes a plurality of switch stages, wherein each switch stage comprises:
(i) a first waveguide portion having a first length;
(ii) a second waveguide portion having a second length that is different than the first length; and
(iii) a waveguide switch that is operative for optically coupling a first light signal received at a first input port to either of the first waveguide portion and the second waveguide portion; and
providing a control signal to each waveguide switch of the plurality thereof to control the optical coupling of its respective input port with each of its respective first and second waveguide portions.

16. The method of claim 15 wherein the delay controller is provided such that at least one waveguide switch of the plurality thereof includes a delay section that includes a trunk waveguide and a delay waveguide, wherein the delay section is operative for controlling cross-coupling between the trunk waveguide and the delay waveguide based on the control signal provided to its respective waveguide switch.

17. The method of claim 16 wherein the delay controller is provided such that at least one waveguide switch of the plurality thereof further includes a first directional coupler and a second directional coupler, wherein the first and second directional couplers are complimentary directional couplers, and wherein the delay section is between the first and second directional couplers.

18. The method of claim 15 wherein at least one waveguide switch of the plurality thereof is provided such that it is operative for controlling the portion of its respective light signal that is optically coupled into each of the first waveguide portion and the second waveguide portion based on a thermo-optic effect.

19. The method of claim 11 further comprising providing the sample signal to each of a plurality of object points on the sample by operations comprising:
conveying the sample signal from the coupler to a beam scanner that includes a plurality of waveguides, a plurality of waveguide switches, and an output port comprising a plurality of facets, wherein each waveguide of the plurality thereof includes a different facet of the plurality thereof, and wherein each waveguide switch of the plurality thereof is operative for switching light between a different pair of waveguides of the plurality thereof; and
controlling the plurality of waveguide switches such that the sample signal is provided to each object point of the plurality thereof from a different facet of the output port.

20. The method of claim 19 further comprising providing the beam scanner such that the facets of the plurality thereof are uniformly spaced.

* * * * *